No. 806,957. PATENTED DEC. 12, 1905.
J. CURRY.
VEHICLE BRAKE.
APPLICATION FILED NOV. 16, 1904.
2 SHEETS—SHEET 1.
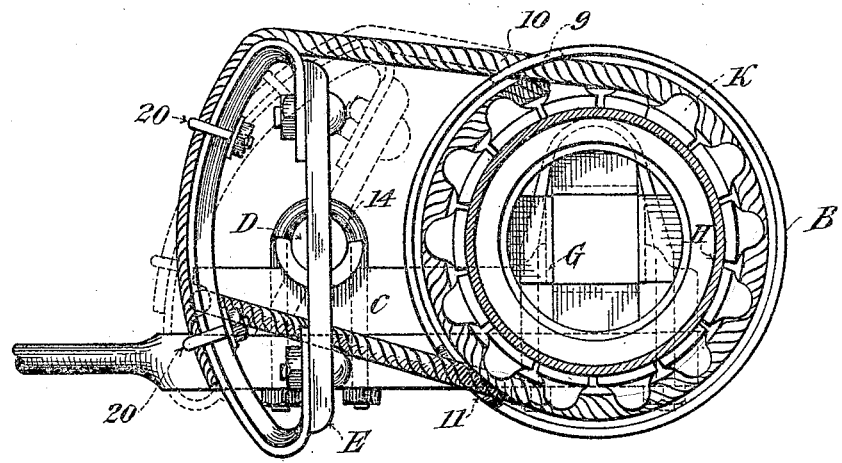
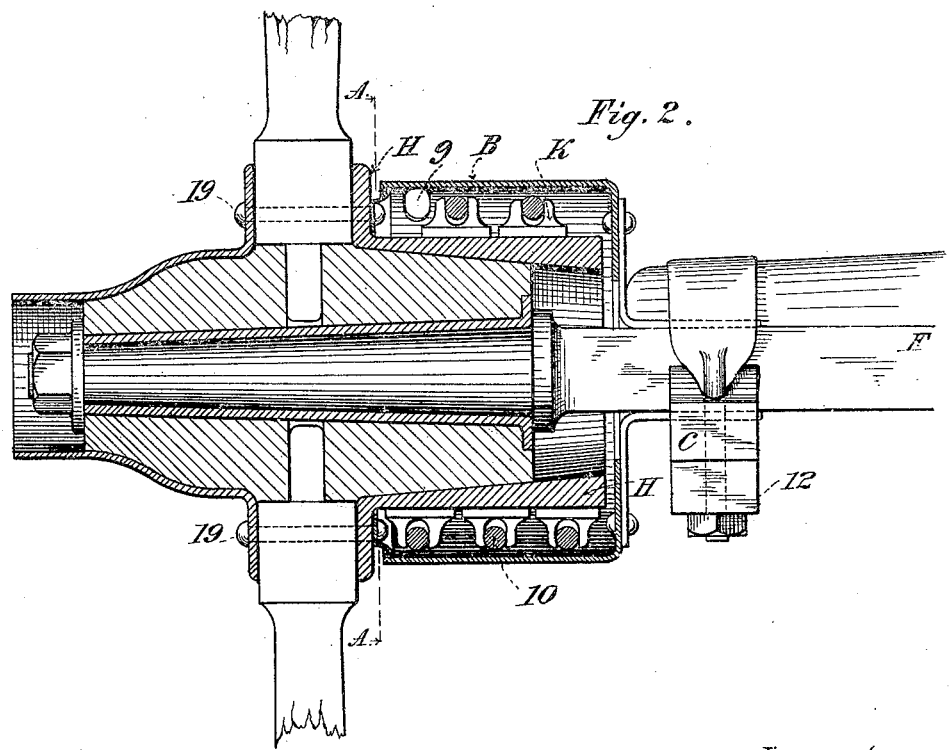
Witnesses.　　　　　　　　　　　　　　　Inventor.

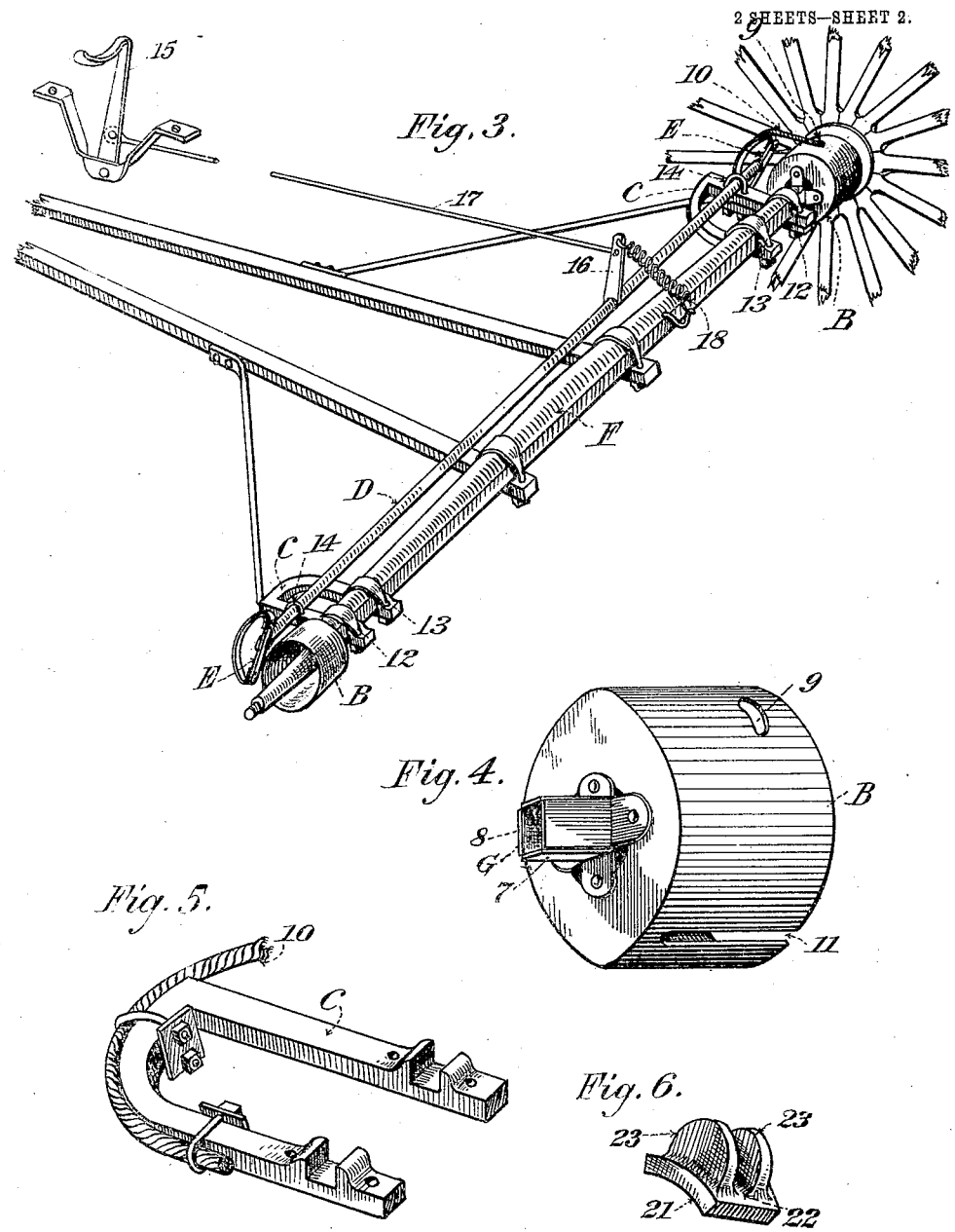

UNITED STATES PATENT OFFICE.

JOHN CURRY, OF VANCOUVER, WASHINGTON.

VEHICLE-BRAKE.

No. 806,957.   Specification of Letters Patent.   Patented Dec. 12, 1905.

Application filed November 16, 1904. Serial No. 232,986.

*To all whom it may concern:*

Be it known that I, JOHN CURRY, a citizen of the United States, residing at Vancouver, in the county of Clark and State of Washington, have invented a new and useful Vehicle-Brake, of which the following is a specification, reference being had to the drawings, which form a part thereof.

My invention relates to improvements in vehicle-brakes in which a brake mechanism is adapted to the hub of the wheel.

The object of my invention is to provide a friction-brake adaptable to the hub of the wheel and which brake can be operated effectively with chains or rods extending in directions or at angles, by which the operation of other brakes is prevented. These objects, as will hereinafter be seen, are accomplished by the device I have discovered, which is novel and useful. I attain these objects and other practical advantages by the mechanism, construction, combination, and arrangement of parts illustrated in the accompanying drawings, in which—

Figure 1 is a sectional view on the line A A of the hub and axle as shown in Fig. 2 with my device attached thereto. Fig. 2 is a sectional view of the axle, hub, and part of the wheel from the rear, showing my device attached. Fig. 3 is a perspective view of the rear axletree, showing wheel with my device attached at one end and part of my device at the other end, also brake-operating mechanism. Fig. 4 is a perspective view of the brake-drum. Fig. 5 is a perspective view of the frame to which one end of the wire brake-rope is attached. Fig. 6 is a detail perspective view of one of the segments of the brake-shoe.

Like numerals and letters refer to like parts in all figures.

My device is constructed as follows: There is a metal brake-drum B, Figs. 1, 2, 3 and detailed in Fig. 4, which is adjusted to the end of an ordinary-formed square metal axletree F by means of a fulcrum-plate G, which may be formed as an integral part of the metal drum or may be formed, as shown, of two parts, 7 and 8, Fig. 4, having right-angle sides and secured to the brake-drum with rivets. The brake-drum has on its upper side an opening 9, Fig. 4, adapted to allow the passage of the wire brake-rope 10 through the same. At its lower side is the slot 11, adapted to allow the passage of the lower end of the brake-rope 10 through the same, also to allow the adjustment of the rope to its position within the brake-drum. There is a two-armed frame C, Figs. 3, 5, secured to each end of the axletree F by means of the clips 12 and 13. This frame is formed partly curved on one side, as shown, and that portion of the side along which the brake-rope extends, as shown in Fig. 5, is grooved, adapting it to receive and allow the brake-rope to be firmly secured to it by suitable means. The transverse brake-bar D extends above the frame C and through the staple 14 on the frame C, Fig. 3. The foot or hand brake 15 is connected longitudinally with the bell-crank lever 16 by means of a connecting-rod 17 or by a metal rope adapted by any convenient means to be conducted over or around cut-aways in the forward parts of vehicles. The bell-crank lever 16 has its upper end connected with the axletree F by means of a spring 18. At each end of the brake-bar D is secured a triangular bell-crank lever E, grooved on its two shorter sides, adapted to receive the brake-rope 10 therein. This lever may be constructed of two pieces, as shown, and its vertical long side as an integral part of the brake-bar D, or the lever may be formed as one integral piece. The wheel is provided with the cylindrical hub-casing H, Figs. 1, 2, secured by the rivets 19 19 and adapted to be adjusted within the brake-drum B and allow space therein for the adjustment to it of the segmental brake-shoe K. Instead of the hub-casing H, I may also substitute and use an integral cylindrical hub, and in either case metal must be used in the construction. The lower end of the brake-rope 10, extending from the frame C, is passed through the slot 11 of the brake-drum B to its inner end, and the rope is then coiled within the brake-drum until its outer coil is brought even with the opening 9, through which the end of the rope is then passed, and thence about and into the outer grooved sides of the triangular bell-crank lever E, to which it is secured by the clips 20 20. The segmental friction-pieces of the brake-shoe K are of metal of equal breadth and suitable lengths and are adjusted to the brake-rope 10 so that they begin near the slot 11 within and at the rear of the brake-drum B. These segments are formed as shown in Fig. 6, having a curved surface 21, adapting them to engage the surface of the hub-casing H. They are also provided with curved grooves 22 on the opposite side, adapted to receive the brake-rope 10, and at the sides of the groove are the parts 23 23, adapted to clench the brake-rope between them, and thus secure the segment to it. The segment which is nearest to the opening 9 of the brake-drum is placed at a proper distance therefrom to allow its necessary forward movement when tension is applied to the brake-rope in setting the brake.

It will be seen that when my device is attached to an ordinary vehicle-gear upon applying power to the hand or foot brake-lever 15 the bell-crank lever 16 is drawn forward by reason of the tension on the brake-rod 17, causing the brake-bar D to revolve and move the triangular bell-crank lever E forward from the dotted-line position to the vertical position, as shown in Fig. 1. This movement causes a forward tension on the upper end of the metal brake-rope 10 and draws its coils tighter, causing the curved surfaces 21 of the segments of the brake-shoe to come into frictional engagement with the surface of the hub-casing H. In setting the brake it is only necessary to take up little more than the slack of the metal brake-rope, and its frictional engagement can be easily regulated as desired. In rotating within the coils of the brake-shoe the hub-casing H also engages the frictional surfaces of the brake-shoe, and thus by its independently-applied power causes additional frictional engagement, tending to wind the coils tighter when the brake tension is applied in any degree, and thus when the brake is set with the limit of tension the wheels may be caused to slide along the ground. Upon releasing the brake the spring 18 draws the bell-crank lever 16 to the rear, causing the brake-bar D to revolve to a distance which brings the triangular bell-crank lever E to the position in which it is shown by the dotted lines in Fig. 1. The backward pressure of the lever E forces the brake-rope 10 into the brake-drum B through the opening 9 and causes the coils of the brake-rope to expand, and the segments of the brake-shoe are thereby released from frictional engagement with the hub-casing H, and the brake is thus immediately released. The brake-shoe segments are formed of such lengths that when they or the hub-casing become worn and it is necessary to take up the slack an extra segment may be placed within the coil to preserve the proper length and adjustment of the brake-shoe segments.

I prefer to construct the triangular lever C of two parts, as shown, and to secure the longer side to the brake-bar D and the outer sides to the longer side by rivets or bolts; but this lever may be constructed as one integral piece and then secured to the brake-bar D.

Other modifications in form, construction, and arrangement of my brake or parts thereof may be made by the skilled mechanic without variance from my invention.

I claim—

1. In a vehicle-brake, the combination of: a brake-drum B, having a securing fulcrum-plate G and the brake-rope opening 9 and slot 11 therein and means to secure the drum to the axle; the two-armed frame C, formed as shown in Fig. 5 with one side curved, and partly grooved on the side, and having means to secure it to the axle; a transverse brake-bar D, having the bell-crank lever 16, the triangular bell-crank lever E, grooved on its shorter sides, and means to secure the brake-bar to the axle; a wheel provided with a cylindrical metal hub-casing H and means to secure the same to it; the coil brake-rope 10 having means to secure one end thereof to the triangular bell-crank lever E and the other to the frame C, and having the brake-shoe K provided with segmental friction-pieces formed as shown in Fig. 6 and having means to secure them to the brake-rope; power-transmitting mechanism, having means to connect the same with the brake-bar D and the brake; all substantially as described.

2. In a vehicle-brake the combination of: a brake-drum B, having a securing fulcrum-plate G and a brake-rope opening 9 and slot 11 therein, and means to secure the drum to the axle; a wheel provided with a cylindrical metal hub-casing H and means to secure the same to it; the coil brake-rope 10, having means to secure one end thereof to the triangular bell-crank lever E and the other to the frame C and also having the brake-shoe K provided with segmental friction-pieces formed as shown in Fig. 6 and having means to secure them to the brake-rope; power-transmitting mechanism, having means to connect the same with the brake-rope and the brake; all substantially as set forth.

3. In a vehicle-brake, the combination of: a wheel provided with a cylindrical metal hub-casing H and means to secure the same to it; an automatically-releasing metal coil brake-cable 10, having means to secure one end thereof to power-transmitting mechanism and the other to the axle, also having the brake-shoe K provided with all-metal segmental friction-pieces of like breadth but of suitable lengths and formed with suitably-curved engaging surfaces and with grooves on their opposite sides adapted to receive the cable therein and also having the cable-clenching parts 23 23; power-transmitting mechanism, having means to connect the same with the brake-cable and brake; all substantially as set forth.

4. In a vehicle-brake, a brake-shoe-retaining drum or casing B upon the axle, having a securing fulcrum-plate G and provided with a brake-rope slot 11 in a suitable place, and of dimensions adapting it to allow the free movement of the brake-rope laterally and through the same, also having an opening 9 in a suitable place adapted to allow the free passage of the brake-rope through the same, substantially as described.

5. In a vehicle-brake, an automatically-releasing metal coil brake-cable 10, having means to secure one end thereof to power-transmitting mechanism and the other to the axle, also having the brake-shoe K provided with all-metal segmental friction-pieces of like breadth but of suitable lengths and formed with suitably-curved engaging surfaces and with grooves on their opposite sides adapted to receive the cable therein and also having the cable-clenching parts 23 23, substantially as described.

6. A vehicle-brake comprising a brake-drum B, having a securing fulcrum-plate G, brake-rope opening 9 and slot 11 with means to secure it to the axle; a frame C formed as shown in Fig. 5, one side curved and partly grooved on the side with means to secure it to the axle; a transverse brake-bar D having a bell-crank lever 16 and a triangular bell-crank lever E grooved on its shorter sides with means to secure the brake-bar to the axle; a wheel provided with a cylindrical metal hub-casing H and means to secure same to it; a coil brake-rope 10 having means to secure one end to the lever E and the other to the frame C; and a brake-shoe composed of segmental friction-pieces formed as shown in Fig. 6 with means to secure same to the brake-rope, substantially as described.

In testimony whereof I have hereunto set my hand in the presence of witnesses.

JOHN CURRY.

Witnesses:
M. C. WRIGHT,
R. J. HENDRIE.